US007739270B2

(12) United States Patent
Brill et al.

(10) Patent No.: US 7,739,270 B2
(45) Date of Patent: Jun. 15, 2010

(54) ENTITY-SPECIFIC TUNED SEARCHING

(75) Inventors: Eric D. Brill, Redmond, WA (US); Noah A. Smith, Baltimore, MD (US); Robert J. Ragno, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 404 days.

(21) Appl. No.: 11/005,989

(22) Filed: Dec. 7, 2004

(65) Prior Publication Data

US 2006/0122978 A1    Jun. 8, 2006

(51) Int. Cl.
*G06F 17/30* (2006.01)
(52) U.S. Cl. .................................................. 707/722
(58) Field of Classification Search ............... 707/2, 707/3, 4, 5, 100, 706, 708, 722, 723, 726, 707/732, 733, 734, 769; 709/217, 219
See application file for complete search history.

(56) References Cited

U.S. PATENT DOCUMENTS

| | | | |
|---|---|---|---|
| 5,780,286 A | 7/1998 | Dillon et al. | |
| 6,012,053 A | 1/2000 | Pant et al. | |
| 6,185,558 B1 | 2/2001 | Bowman et al. | |
| 6,363,377 B1 * | 3/2002 | Kravets et al. | 707/4 |
| 6,473,752 B1 | 10/2002 | Fleming, III | |
| 6,772,150 B1 * | 8/2004 | Whitman et al. | 707/6 |
| 2002/0147724 A1 * | 10/2002 | Fries et al. | 707/100 |
| 2003/0014399 A1 | 1/2003 | Hansen et al. | |
| 2004/0225643 A1 * | 11/2004 | Alpha et al. | 707/3 |
| 2005/0055345 A1 * | 3/2005 | Ripley | 707/3 |
| 2005/0080771 A1 * | 4/2005 | Fish | 707/3 |
| 2006/0206467 A1 * | 9/2006 | Jackson et al. | 707/3 |

FOREIGN PATENT DOCUMENTS

| | | |
|---|---|---|
| EP | 1050830 A | 11/2000 |
| WO | 2005033979 A | 4/2005 |

OTHER PUBLICATIONS

Cross et al., Similarity or Interference for Accessing Relevance in Information Retrieval, Dept. of Computer Science & Eng., South Carolina Univ., Columbia, SC, USA; Fuzzy Systems, 2001. The 10th IEEE International Conf. on, Dec. 2-5, 2001, pp. 1287-1290 vol. 3.*

(Continued)

*Primary Examiner*—Greta L Robinson
(74) *Attorney, Agent, or Firm*—Lee & Hayes, PLLC

(57) ABSTRACT

The present invention leverages relevance data to provide enhanced search query results based on relevancy to a specific entity via an entity-specific tunable search. This allows an entity to retrieve information that is of more value to that entity, in a faster and more efficient manner. The entity itself can be an individual user, a grouping of users, and/or an enterprise and the like. In one instance of the present invention, entity-specific relevance information is determined via employment of similarity of the entity to another entity or group of entities. Interest levels and/or satisfaction levels of similar entities can also be utilized along with similarity information to facilitate in deriving the relevance information.

26 Claims, 7 Drawing Sheets

OTHER PUBLICATIONS

Widyantoro et al., Using Fuzzy Ontology for Query Refinement in Personalized Abstract Search Engine, IFSA World Congress and 20th NAFIPS International Conference, 2001. Joint 9th, vol. 1, Jul. 25-28, 2001, pp. 610-615 vol. 1, Digital Object Identifier 10.1109/NAFIPS. 2001.944322.*

Harlow and Lane Chapter 4, Immunization. In: Antibodies, A laboratory manual, *Cold Spring Harbor Press*, pp. 53-138 (1988).

Stein et al., Definition of "compose", In: *The Random House College Dictionary*, p. 276 (1975).

Massimiliano Albanese, Antonio Picariello, Carlo Sansone, and Lucio Sansone. A Web personalization system based on Web usage mining techniques. In Proceedings of WWW, pp. 288-289, New York, NY, 2004.

David Goldberg, David Nichols, Brian M. Oki, and Douglas Terry. Using collaborative filtering to weave and information tapestry. Communications of the ACM, 35(12):61-70, 1992.

Kazunari Sugiyama, Kenji Hatano, and Masatoshi Yoshikawa. Adaptive Web search based on user profile constructed without any effort from users. In Proceedings of WWW, pp. 675-683, New York, NY, 2004.

D Beeferman and a Berger: "Agglomerative clustering of a search engine query log" Proceedings of The ACM SIGKDD. International Conference on Knowledge Discovery and Data Mining, ACM, US, 2000.

J R Wen et al.: "Clustering User Queries of a Search Engine" Intenational World Wide Web Conference, 2001.

* cited by examiner

ENTITY-SPECIFIC TUNED SEARCHING

TECHNICAL FIELD

The present invention relates generally to data searching, and more particularly to systems and methods for tuning a search based on automatically derived, entity-specific relevance information.

BACKGROUND OF THE INVENTION

Typically, the information available via web sites and servers is accessed via a web browser executing on a web client (e.g., a computer). For example, a web user can deploy a web browser and access a web site by entering the web site Uniform Resource Locator (URL) into an address bar of a web browser and pressing the enter key on a keyboard or clicking a "go" button with a mouse. The URL typically includes three pieces of information that facilitate access: a protocol (set of rules and standards for the exchange of information in computer communication) string, a domain name (often based on the name of an organization that maintains the web site), and a path to the desired document on that site.

In some instances, the user knows, a priori, the name of the site or server, and/or the URL to the site or server that the user desires to access. In such situations, the user can access the site, as described above, via entering the URL in the address bar and connecting to the site. However, in most instances, the user does not know the URL or the site name. Instead, the user employs a search function to facilitate locating a particular site based on keywords provided by the user.

The user can enter keywords into a general search engine, which will search the entirety of the World Wide Web and return sites that it determines to be related to the keywords. Often, however, the general search engine will return a substantial number of sites that are wholly unrelated to the particular interests of the user. For example, if the user searched using the keyword "virus," rather than obtaining information related only to computer viruses the user would receive information relating to biological viruses as well as computer viruses. The user can thereafter scroll through a plurality of returned sites and attempt to determine if they are related to user interests. Scrolling through returned results can be extremely time-consuming and frustrating to the user, as general search engines can return a substantial number of sites when performing a search. The user can attempt to narrow the search via utilizing a combination of Boolean operators, but it can be difficult to construct an appropriate Boolean search that will result in a return of sites containing relevant information.

Furthermore, some conventional general search engines attempt to infer what a user is searching for based upon the keywords. For instance, if a user entered the term "virus" into the general search engine, the search engine can return a plurality of sites together with suggestions for narrowing the search. More particularly, the search engine could return a plurality of suggestions, such as "do you want to search for a computer virus?," "do you want to search for a biological virus?," etc. For many searches (especially for more detailed and specific searches), this conventional method requires selecting a continuing hierarchy of suggested searches, and the returned sites may still lack relevant information. Furthermore, the user may desire to locate a site that will not be encompassed by the returned search suggestions.

Users continue to desire the ability to search for information based on what they personally find relevant. Individual users are unique in their cares and concerns and, thus, they have different "relevancy" criteria. Some technologies permit users to input data to create a user profile that is employed to provide more relevant search results. However, users are often too busy to take the time to provide lengthy information criteria in order to facilitate the search process. They demand a quick and efficient means to return search results that best suits their own unique needs, thereby increasing their satisfaction with their searches.

SUMMARY OF THE INVENTION

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to the more detailed description that is presented later.

The present invention relates generally to data searching, and more particularly to systems and methods for tuning a search based on automatically derived, entity-specific relevance information. Entity-specific relevance is leveraged to provide entity-dependent, enhanced search query results. This provides a systematic means to augment search query results based on relevancy to a specific entity. By providing an entity-specific tunable search, the present invention allows an entity to retrieve information that is of more value to that entity, in a faster and more efficient manner. The entity itself can be an individual user, a grouping of users, and/or an enterprise and the like. In one instance of the present invention, the entity-specific relevance information is determined via employment of similarity of the entity to another entity or entities. Interest levels and/or satisfaction levels of similar entities can also be utilized along with similarity information to facilitate in deriving the relevance information. This allows the present invention to fully leverage associated information to provide a means to enhance search query results such that they are substantially relevant to the entity, increasing an entity's satisfaction with the search results.

To the accomplishment of the foregoing and related ends, certain illustrative aspects of the invention are described herein in connection with the following description and the annexed drawings. These aspects are indicative, however, of but a few of the various ways in which the principles of the invention may be employed and the present invention is intended to include all such aspects and their equivalents. Other advantages and novel features of the invention may become apparent from the following detailed description of the invention when considered in conjunction with the drawings.

DETAILED DESCRIPTION OF THE INVENTION

Figure 1:
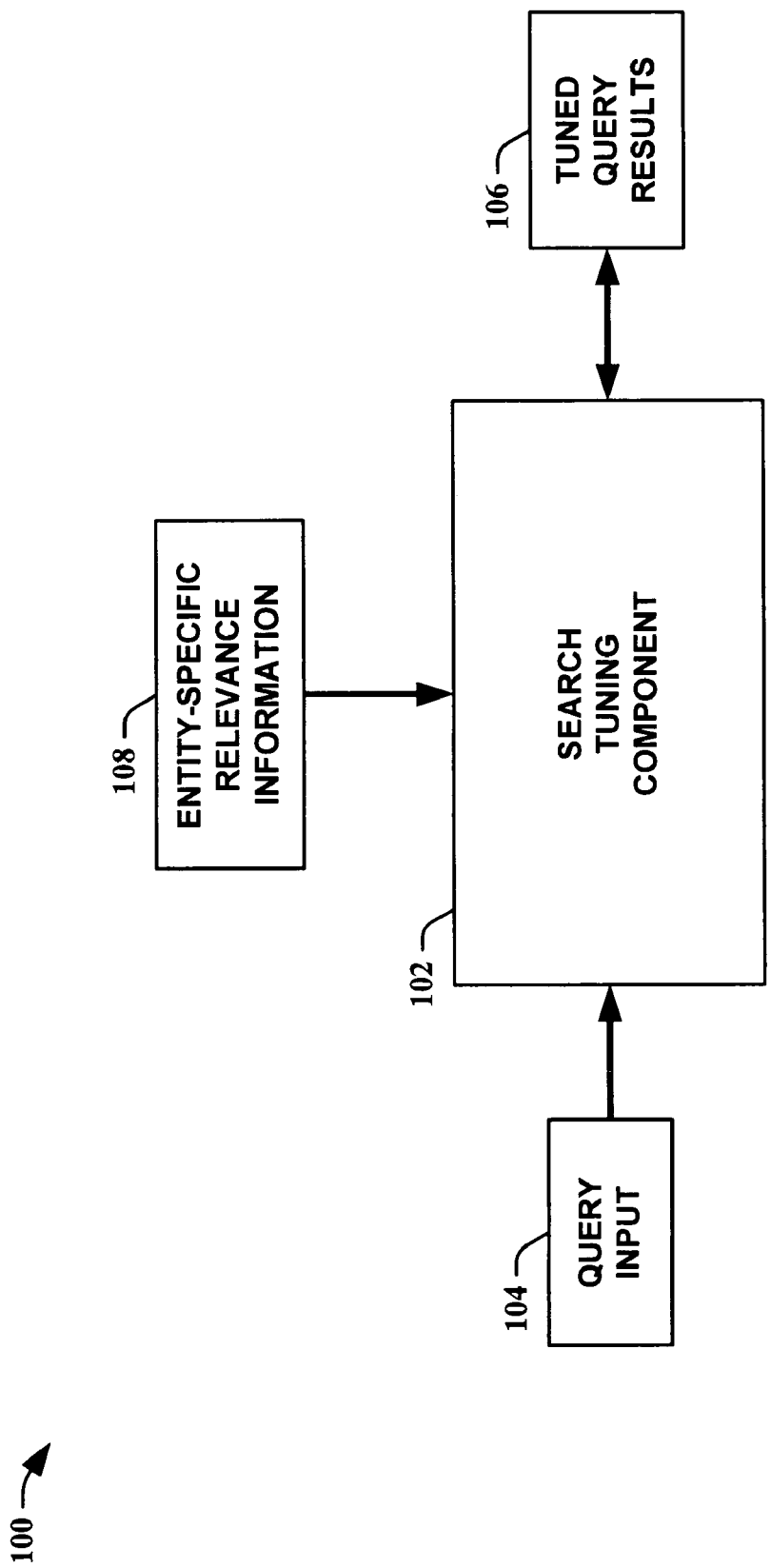
FIG. 1 is a block diagram of a search tuning system in accordance with an aspect of the present invention.

The present invention is now described with reference to the drawings, wherein like reference numerals are used to refer to like elements throughout. In the following description, for purposes of explanation, numerous specific details are set forth in order to provide a thorough understanding of the present invention. It may be evident, however, that the present invention may be practiced without these specific details. In other instances, well-known structures and devices are shown in block diagram form in order to facilitate describing the present invention.

As used in this application, the term "component" is intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a computer component. One or more components may reside within a process and/or thread of execution and a component may be localized on one computer and/or distributed between two or more computers. A "thread" is the entity within a process that the operating system kernel schedules for execution. As is well known in the art, each thread has an associated "context" which is the volatile data associated with the execution of the thread. A thread's context includes the contents of system registers and the virtual address belonging to the thread's process. Thus, the actual data comprising a thread's context varies as it executes.

The present invention provides systems and methods for automatically personalizing search results for a query, depending on a specific entity. This is accomplished utilizing information logged about users who use, for example, a search engine, utilizing information such as, for example, past queries each user has issued to the search engine, and, optionally, a sampling of the search results each user has shown interest in by, for example, clicking on a result. Quality search results are a paramount service provided by search engines, and differences in result quality are the most obvious differentiator between competing search engines. The present invention can significantly improve a user's satisfaction with search results, providing a vast advantage over the competition for search entities employing it.

In FIG. 1, a block diagram of a search tuning system 100 in accordance with an aspect of the present invention is shown. The search tuning system 100 is comprised of a search tuning component 102 that receives a query input 104 and provides tuned query results 106 via employment of entity-specific relevance information 108. The search tuning component 102 utilizes an entity's search and/or selection history and/or the histories of other users and/or other groups such as enterprises and the like to tune the query results 106. Thus, for example, the present invention can be employed to tune searches for a user relative to a company that a user is employed with, reducing the amount of search information that is not related to their work tasks. In one instance of the present invention search query logs of Web users from a Web search engine are utilized to predict a particular user's choice.

Figure 2:
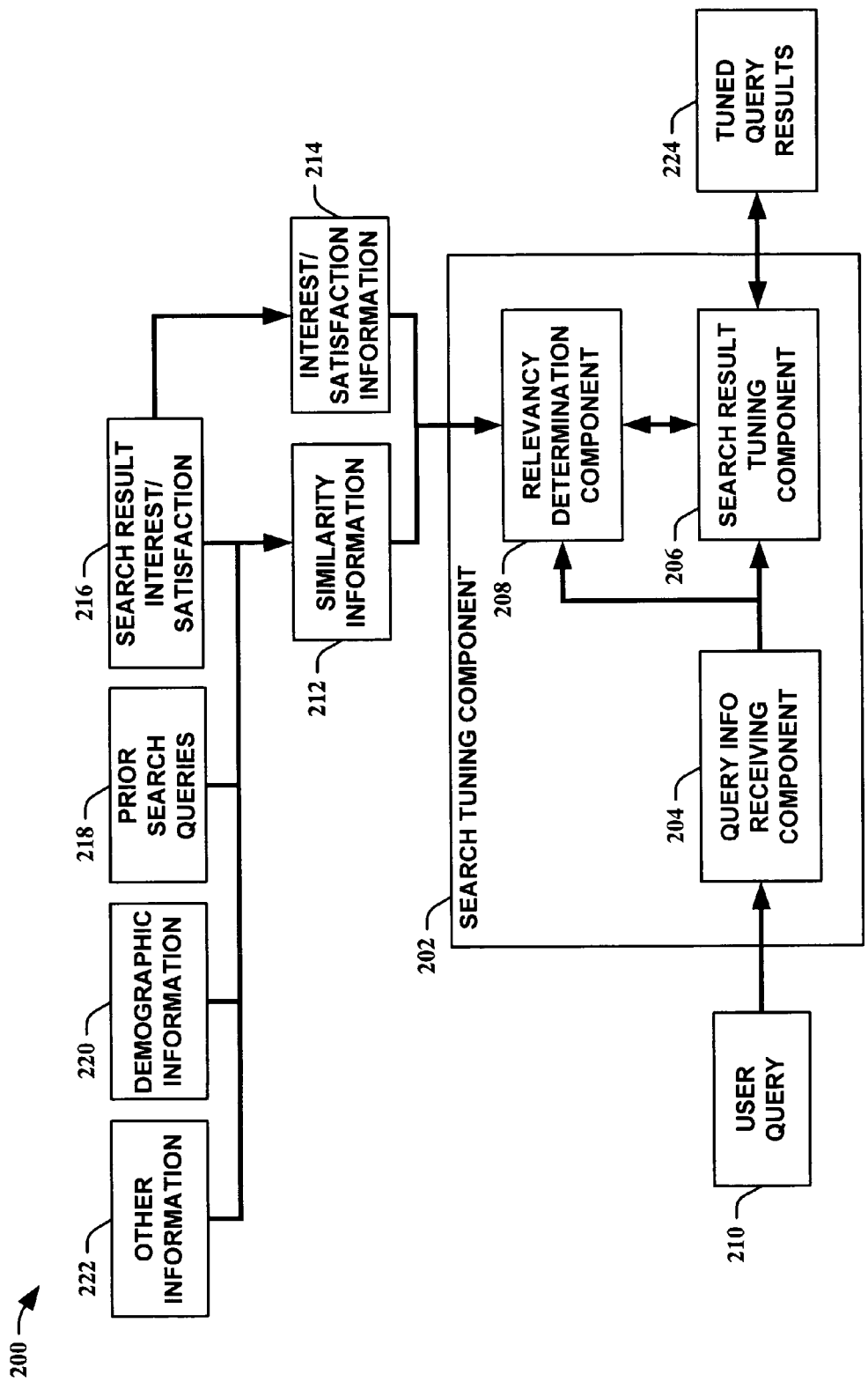
FIG. 2 is another block diagram of a search tuning system in accordance with an aspect of the present invention.

Referring to FIG. 2, another block diagram of a search tuning system 200 in accordance with an aspect of the present invention is illustrated. The search tuning system 200 is comprised of a search tuning component 202. The search tuning component 202 is comprised of a query information receiving component 204, a search result tuning component 206, and a relevancy determination component 208. The query information receiving component 204 receives query related information such as, for example, a user query 210. The user query 210 is passed to the search result tuning component 206 and/or the relevancy determination component 208. The search result tuning component 206 determines an optimal search result list based, at least in part, on relevancy information obtained from the relevancy determination component 208. The relevancy determination component 208 utilizes similarity information 212 and/or interest/satisfaction information 214 to determine the user-specific relevancy information. The similarity information 212 employs information such as, for example, search result interest/satisfaction information 216, prior search queries 218, demographic information 220, and other information 222. The interest/satisfaction information 214 can utilize the search result interest/satisfaction information 216 as well. The search result tuning component 206 employs the relevance information to automatically provide tuned query results 224 that are user-specific.

The supra systems of the present invention employ a tuning algorithm in a search that takes, for example, a user query and document collection as input and returns a list of documents from that collection sorted by their estimated relevance to the query. Typically, ranking algorithms utilized by Web search engines return the same ranking for a given query, regardless of who entered the query. For some queries, this technique returns acceptable results. E.g., most likely the vast majority of users who query "Disney home page" will be satisfied by the same web page (the Disney home page). However, for more open ended queries such as "music," "money," "travel," and for ambiguous word queries such as "Saturn" and "magic," this one-ranking-fits-all strategy is suboptimal. Thus, different people who issue the query "music" to a search engine might have very different intents. Therefore, there is no single ranking of return results for this query that would satisfy all users. The present invention provides systems and methods for solving this problem by automatically learning how to personalize the order of results returned for a query.

Conceptually, the present invention can be considered as a two step process. First, for every search user, their similarity to all other users is computed. Similarity can be based upon the queries each user has issued in the past, search return results each user has shown interest in, demographic information about the users, etc. To give a concrete example of a similarity measure, the similarity of two entities can be computed as:

$$\text{similarity} = \frac{\text{Number of quereis both entities have issued}}{\text{Number of quereis either entity has issued}} \quad \text{(Eq. 1)}$$

Next, when an entity u issues query q, all entities who have issued that query in the past are determined, along with the search return results that each entity shown interest in for that query. Now for each result r in the return set for that query, the probability that u will find r relevant can be estimated as:

$$\text{Estimated Relevancy Probability}(u, q, r) = \quad \text{(Eq. 2)}$$

$$\frac{\sum_{u' \in \text{ entities who queried } q} \text{similarity}(u, u')^* \text{interest\_in}(u', q, r)}{\sum_{u' \in \text{ entities who queried } q} \text{similarity}(u, u')}$$

where:

$$\text{interest\_in}(u', q, r) = \begin{cases} \alpha & \begin{array}{l} \text{If entity } u' \text{ has ever issued} \\ \text{query } q \text{ and expressed positive} \\ \text{interest in return result } r \end{array} \\ \beta & \begin{array}{l} \text{If entity } u' \text{ has ever issued} \\ \text{query } q \text{ and expressed negative} \\ \text{interest in return result } r \end{array} \\ 0 & \text{Otherwise} \end{cases}$$

Thus, positive (α) and negative (β) data points are not necessarily treated identically. The simplest configuration would be α=1, β=−1, but the relative ratio can be adjusted. For each r in the return set for q, the relevance probability for entity u is computed, and the return set of documents is sorted according to this probability.

The above method can also be generalized into an estimated relevancy score as:

$$\text{Estimated Relevancy Score}(u, q, r) = \sum_{u' \in \text{ entities who queried } q} \text{similarity}(u, u')^* \text{interest\_in}(u', q, r) \quad \text{(Eq. 3)}$$

The estimated relevancy score can be normalized, if desired, by any suitable means. Typically, people only tend to look at the first screenful of results for a query, so the top "N" results for a query are constrained to re-sort, where N is any integer from one to infinity. For example, if a search engine shows 20 results per result page, and the 23$^{rd}$ ranked document is the best document for that query, there is little information on whether people found that document to be relevant to the query, since very few people explore past the first result page.

This can be remedied by allowing for a more aggressive re-ranking by changing the formulation as follows. When an entity u issues query q, all entities who have shown interest in any search result that appears in the top "N" (say N=1000) return documents for query q in the past are determined (note, entities don't have to issue query q and show interest in a particular document (such as, for example, via clicking on the document), but could have issued a different query q' and showed interest in that document). Now for each result r in the return set for that query, the probability that u will find r relevant can be estimated as:

$$\text{Estimated RelevancyProbability}(u, q, r) = \frac{\sum_{\substack{u' \in \text{ entities who expressed interest in at least} \\ \text{one doc in the (big) return set for query } q}} \text{similarity}(u, u')^* \text{interest\_in}(u', r)}{\sum_{\substack{u' \in \text{ entities who expressed interest in at least} \\ \text{one doc in the (big) return set for query } q}} \text{similarity}(u, u')} ; \quad \text{(Eq. 4)}$$

where:

$$\text{interest\_in}(u', r) = \begin{cases} \alpha & \text{If entity } u' \text{ has ever issued some query and expressed positive interest in return result } r \\ \beta & \text{If entity } u' \text{ has ever issued some query and expressed negative interest in return result } r \\ 0 & \text{Otherwise} \end{cases};$$

Thus, positive (α) and negative (β) data points are not necessarily treated identically. The simplest configuration would be α=1, β=−1, but the relative ratio can be adjusted. For each r in the return set for q, the relevance probability for user u is computed, and the return set of documents is sorted according to this probability.

The above method can also be generalized into an estimated relevancy score as:

$$\text{Estimated Relevancy Score}(u, q, r) = \sum_{\substack{u' \in \text{ entities who expressed interest in at least} \\ \text{one doc in the (big) return set for query } q}} \text{similarity}(u, u')^* \text{interest\_in}(u', r) \quad \text{(Eq. 5)}$$

The estimated relevancy score can be normalized, if desired, by any suitable means.

In a more general sense, a collaborative filtering approach can utilize a subset of entities from a learning set to predict interest (relevancy) to an active entity. This subset should be in some sense similar to the active entity. A framework for collaborative re-ranking where similar entities are allowed to vote for results, and the votes are utilized to re-rank the results is now described. Let u be an active entity, as before, and R be a result set. Let S be a set of similar entities; each s∈S has a weight $\lambda_s$. This $\lambda_s$ should be higher for more similar entities. The score of a result r∈R is:

$$\text{score}(r) = \sum_{s \in S} \lambda_s \cdot \begin{pmatrix} \text{\# times } s \text{ queried } q \text{ and showed interest} \\ \text{in } r \text{ in the learning period} \end{pmatrix} \quad \text{(Eq. 6)}$$

The results R are then re-ranked utilizing this score. The supra techniques are simply generalized by assigning weights to users (S can be the entire entity set and $\lambda_s$=0 for some entities; this is equivalent.).

Figure 3:
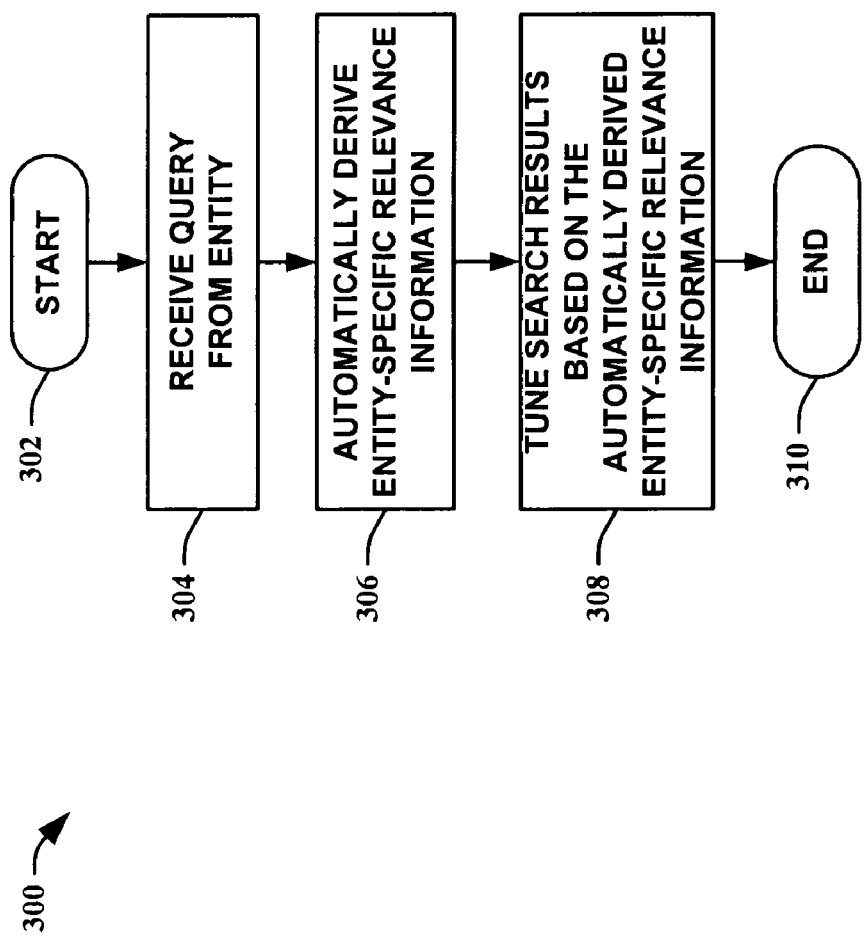
FIG. 3 is a flow diagram of a method of facilitating searching in accordance with an aspect of the present invention.
Figure 4:
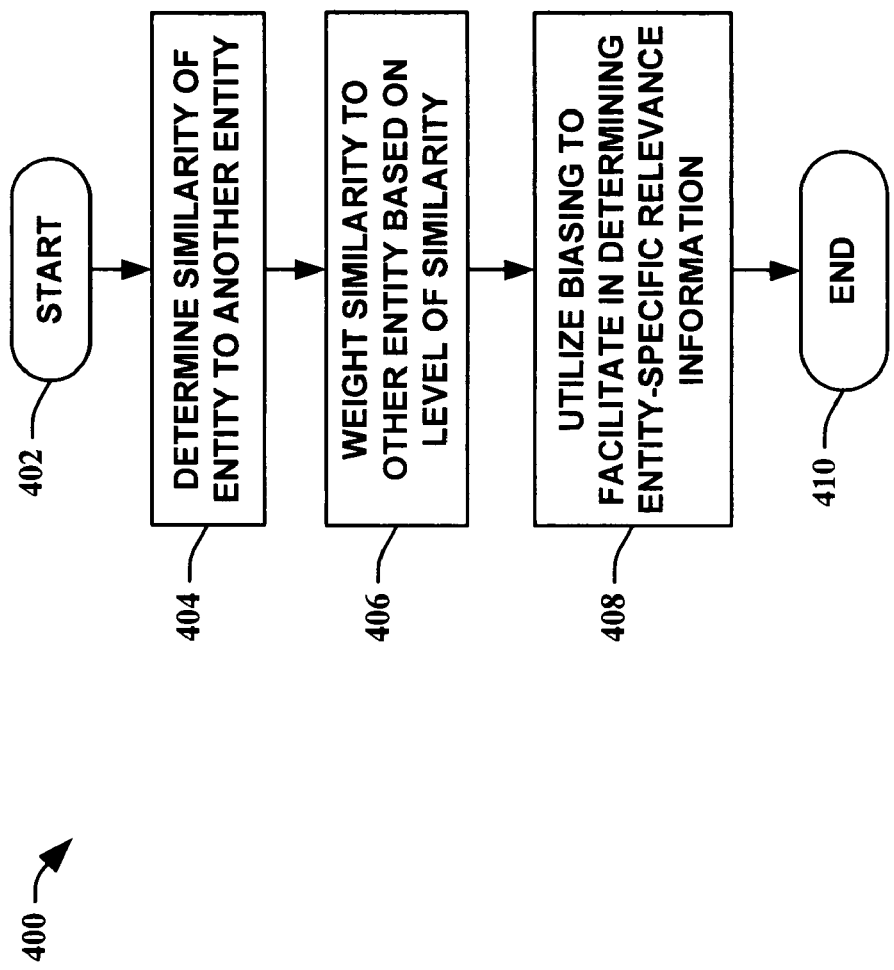
FIG. 4 is another flow diagram of a method of facilitating searching in accordance with an aspect of the present invention.
Figure 5:
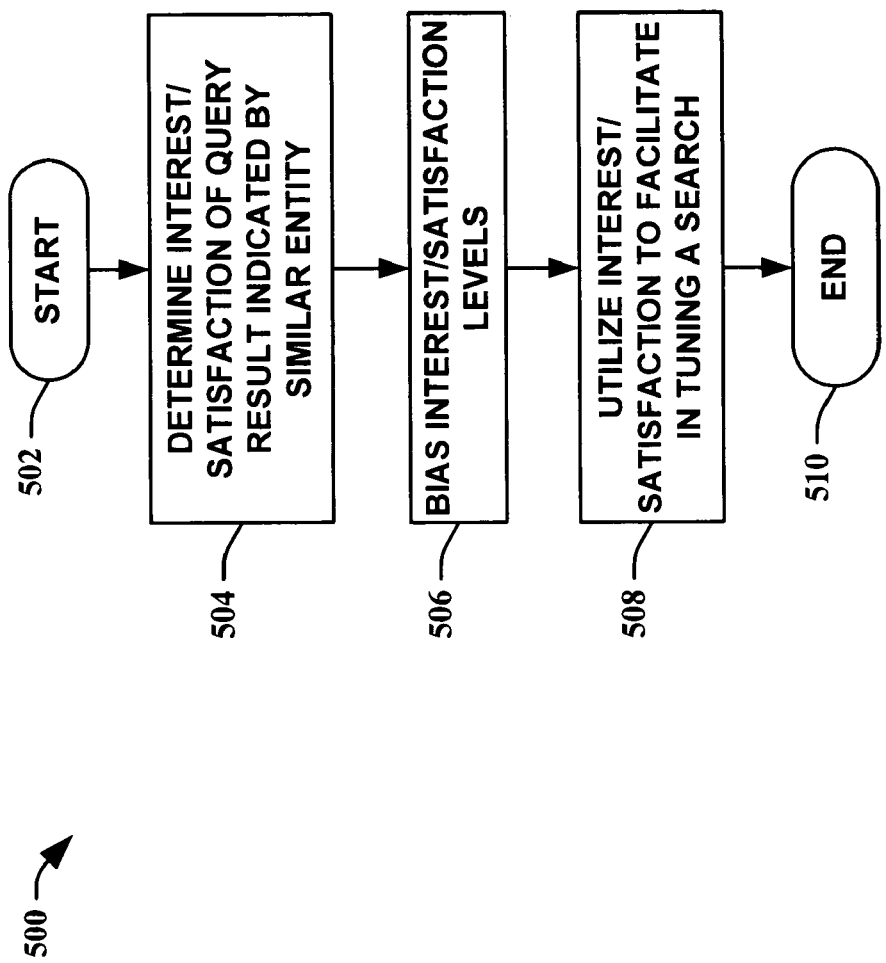
FIG. 5 is yet another flow diagram of a method of facilitating searching in accordance with an aspect of the present invention.

In view of the exemplary systems shown and described above, methodologies that may be implemented in accordance with the present invention will be better appreciated with reference to the flow charts of FIGS. 3-5. While, for purposes of simplicity of explanation, the methodologies are shown and described as a series of blocks, it is to be understood and appreciated that the present invention is not limited by the order of the blocks, as some blocks may, in accordance with the present invention, occur in different orders and/or concurrently with other blocks from that shown and described herein. Moreover, not all illustrated blocks may be required to implement the methodologies in accordance with the present invention.

The invention may be described in the general context of computer-executable instructions, such as program modules, executed by one or more components. Generally, program modules include routines, programs, objects, data structures, etc., that perform particular tasks or implement particular abstract data types. Typically, the functionality of the program modules may be combined or distributed as desired in various instances of the present invention.

In FIG. 3, a flow diagram of a method 300 of facilitating searching in accordance with an aspect of the present invention is shown. The method 300 starts 302 by receiving a query from an entity 304. Relevance information is automatically derived for that specific entity 306. A search result is then tuned via employment of the automatically derived entity-specific relevance information 308, ending the flow 310. The automatic tuning can employ user similarity information to other users and/or groups of users and the like. Likewise, interest (positive and negative) and/or satisfaction (positive and negative) information can also be utilized in determining the relevancy of a particular search result to a specific user to facilitate in tuning the search results. These aspects of the present invention have been discussed in detail supra.

Turning to FIG. 4, another flow diagram of a method 400 of facilitating searching in accordance with an aspect of the present invention is depicted. The method 400 starts 402 by determining similarity of an active entity to another entity 404. The entities can be single users and/or groups of users and/or an enterprise and the like. Similarity determination processes have been described previously. These processes can include, but are not limited to, comparing a user to an entire genre of users and/or a subset of a group of users. By utilizing subsets, a higher degree of similarity can be obtained in some circumstances. A weighting means is then utilized to facilitate in indicating to what degree or level an active entity is similar to another entity 406. The degree of similarity aids in determining the probability that if the other entity finds an item interesting that the active entity will also find the item interesting. A strong weighting gives a strong indication that the other entity has similar likes, and also dislikes, as the active entity. Thus, the weighting, or biasing, of similarity is utilized to facilitate in determining entity-specific relevance information 408, ending the flow 410.

Looking at FIG. 5, yet another flow diagram of a method 500 of facilitating searching in accordance with an aspect of the present invention is illustrated. The method 500 starts 502 by determining interest and/or satisfaction of a query result by an entity similar to an active entity 504. As described previously, interest/satisfaction can be determined by various means such as, for example, if an entity clicked on a result, hovered over the result, looked at a result for a period of time, and/or showed interest/satisfaction in another result that was similar to a current result and the like. Interest is defined as when an entity expresses some desire towards a result. This desire can be positive and/or negative. Thus, disinterest, or negative interest, can be included as part of interest. Satisfaction is defined as when an entity indicates that a result fulfilled some aspect of a requirement to the entity. Like interest, satisfaction can be positive and/or negative, including dissatisfaction. Thus, an entity can, for example, click on a query result showing interest, but then quickly dismiss the resulting query page as non-relevant to the task at hand, indicating dissatisfaction. Therefore, interest and/or satisfaction levels are biased according to a determination factor 506. The determination factor can be a general factor weighting interest over satisfaction or vice versa. Weighting can also be utilized to bias interest and/or disinterest levels and/or satisfaction and/or dissatisfaction levels. Or, the determination factor can include a level of confidence of the interest and/or satisfaction levels. For example, it can be difficult at times to determine whether a user was truly satisfied or not. If the indication of satisfaction is "time on query result," the weighting of the satisfaction level can be light to reflect the possibility that the user remained on a page for reasons other than satisfaction (such as answering a telephone call while viewing a query result, etc.). The interest and/or satisfaction information can then be utilized to facilitate in tuning a search by an active entity 508, ending the flow 510. For example, although similarity of the active entity to another entity can facilitate in determining a list of possible query results, the interest/satisfaction information can be further utilized to rank these results such that the highest interest/satisfaction level results are indicated to the active entity first. This enables the present invention to achieve a substantial increase in the entity's overall satisfaction with the query results.

Figure 6:
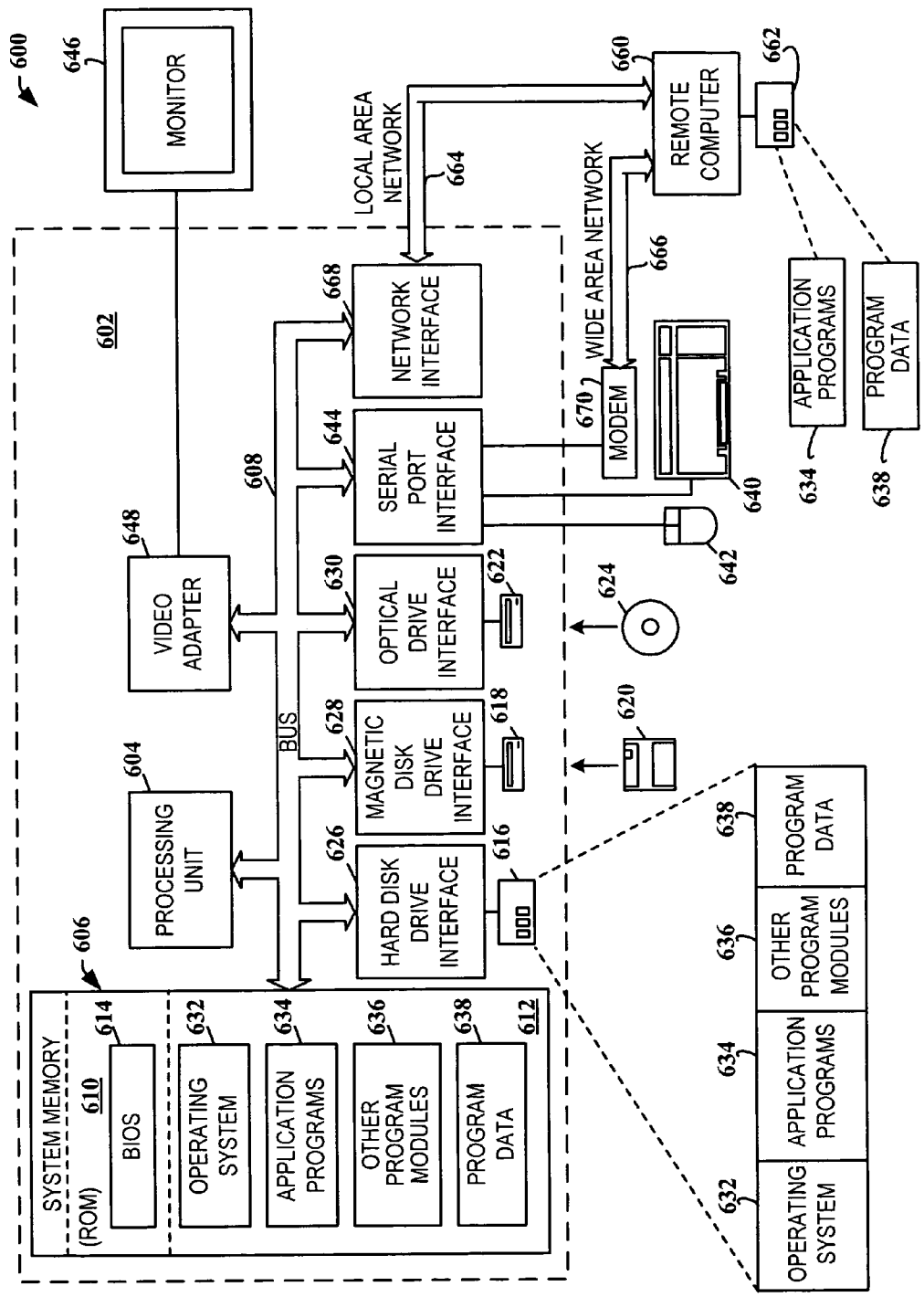
FIG. 6 illustrates an example operating environment in which the present invention can function.

In order to provide additional context for implementing various aspects of the present invention, FIG. 6 and the following discussion is intended to provide a brief, general description of a suitable computing environment 600 in which the various aspects of the present invention may be implemented. While the invention has been described above in the general context of computer-executable instructions of a computer program that runs on a local computer and/or remote computer, those skilled in the art will recognize that the invention also may be implemented in combination with other program modules. Generally, program modules include routines, programs, components, data structures, etc., that perform particular tasks and/or implement particular abstract data types. Moreover, those skilled in the art will appreciate that the inventive methods may be practiced with other computer system configurations, including single-processor or multi-processor computer systems, minicomputers, mainframe computers, as well as personal computers, hand-held computing devices, microprocessor-based and/or programmable consumer electronics, and the like, each of which may operatively communicate with one or more associated devices. The illustrated aspects of the invention may also be practiced in distributed computing environments where certain tasks are performed by remote processing devices that are linked through a communications network. However, some, if not all, aspects of the invention may be practiced on standalone computers. In a distributed computing environment, program modules may be located in local and/or remote memory storage devices.

As used in this application, the term "component" is intended to refer to a computer-related entity, either hardware, a combination of hardware and software, software, or software in execution. For example, a component may be, but is not limited to, a process running on a processor, a processor, an object, an executable, a thread of execution, a program, and a computer. By way of illustration, an application running on a server and/or the server can be a component. In addition, a component may include one or more subcomponents.

With reference to FIG. 6, an exemplary system environment 600 for implementing the various aspects of the invention includes a conventional computer 602, including a processing unit 604, a system memory 606, and a system bus 608 that couples various system components, including the system memory, to the processing unit 604. The processing unit 604 may be any commercially available or proprietary processor. In addition, the processing unit may be implemented as multi-processor formed of more than one processor, such as may be connected in parallel.

The system bus 608 may be any of several types of bus structure including a memory bus or memory controller, a peripheral bus, and a local bus using any of a variety of conventional bus architectures such as PCI, VESA, Microchannel, ISA, and EISA, to name a few. The system memory 606 includes read only memory (ROM) 610 and random access memory (RAM) 612. A basic input/output system (BIOS) 614, containing the basic routines that help to transfer information between elements within the computer 602, such as during start-up, is stored in ROM 610.

The computer 602 also may include, for example, a hard disk drive 616, a magnetic disk drive 618, e.g. to read from or write to a removable disk 620, and an optical disk drive 622, e.g., for reading from or writing to a CD-ROM disk 624 or other optical media. The hard disk drive 616, magnetic disk drive 618, and optical disk drive 622 are connected to the system bus 608 by a hard disk drive interface 626, a magnetic disk drive interface 628, and an optical drive interface 630, respectively. The drives 616-622 and their associated computer-readable media provide nonvolatile storage of data, data structures, computer-executable instructions, etc. for the computer 602. Although the description of computer-readable media above refers to a hard disk, a removable magnetic disk and a CD, it should be appreciated by those skilled in the art that other types of media which are readable by a computer, such as magnetic cassettes, flash memory cards, digital video disks, Bernoulli cartridges, and the like, can also be used in the exemplary operating environment 600, and farther that any such media may contain computer-executable instructions for performing the methods of the present invention.

A number of program modules may be stored in the drives 616-622 and RAM 612, including an operating system 632, one or more application programs 634, other program modules 636, and program data 638. The operating system 632 may be any suitable operating system or combination of operating systems. By way of example, the application programs 634 and program modules 636 can include a searching scheme in accordance with an aspect of the present invention.

A user can enter commands and information into the computer 602 through one or more user input devices, such as a keyboard 640 and a pointing device (e.g., a mouse 642). Other input devices (not shown) may include a microphone, a joystick, a game pad, a satellite dish, a wireless remote, a scanner, or the like. These and other input devices are often connected to the processing unit 604 through a serial port interface 644 that is coupled to the system bus 608, but may be connected by other interfaces, such as a parallel port, a game port or a universal serial bus (USB). A monitor 646 or other type of display device is also connected to the system bus 608 via an interface, such as a video adapter 648. In addition to the monitor 646, the computer 602 may include other peripheral output devices (not shown), such as speakers, printers, etc.

It is to be appreciated that the computer 602 can operate in a networked environment using logical connections to one or more remote computers 660. The remote computer 660 may be a workstation, a server computer, a router, a peer device or other common network node, and typically includes many or all of the elements described relative to the computer 602, although for purposes of brevity, only a memory storage device 662 is illustrated in FIG. 6. The logical connections depicted in FIG. 6 can include a local area network (LAN) 664 and a wide area network (WAN) 666. Such networking environments are commonplace in offices, enterprise-wide computer networks, intranets and the Internet.

When used in a LAN networking environment, for example, the computer 602 is connected to the local network 664 through a network interface or adapter 668. When used in a WAN networking environment, the computer 602 typically includes a modem (e.g., telephone, DSL, cable, etc.) 670, or is connected to a communications server on the LAN, or has other means for establishing communications over the WAN 666, such as the Internet. The modem 670, which can be internal or external relative to the computer 602, is connected to the system bus 608 via the serial port interface 644. In a networked environment, program modules (including application programs 634) and/or program data 638 can be stored in the remote memory storage device 662. It will be appreciated that the network connections shown are exemplary and other means (e.g., wired or wireless) of establishing a communications link between the computers 602 and 660 can be used when carrying out an aspect of the present invention.

In accordance with the practices of persons skilled in the art of computer programming, the present invention has been described with reference to acts and symbolic representations of operations that are performed by a computer, such as the computer 602 or remote computer 660, unless otherwise indicated. Such acts and operations are sometimes referred to as being computer-executed. It will be appreciated that the acts and symbolically represented operations include the manipulation by the processing unit 604 of electrical signals representing data bits which causes a resulting transformation or reduction of the electrical signal representation, and the maintenance of data bits at memory locations in the memory system (including the system memory 606, hard drive 616, floppy disks 620, CD-ROM 624, and remote memory 662) to thereby reconfigure or otherwise alter the computer system's operation, as well as other processing of signals. The memory locations where such data bits are maintained are physical locations that have particular electrical, magnetic, or optical properties corresponding to the data bits.

Figure 7:
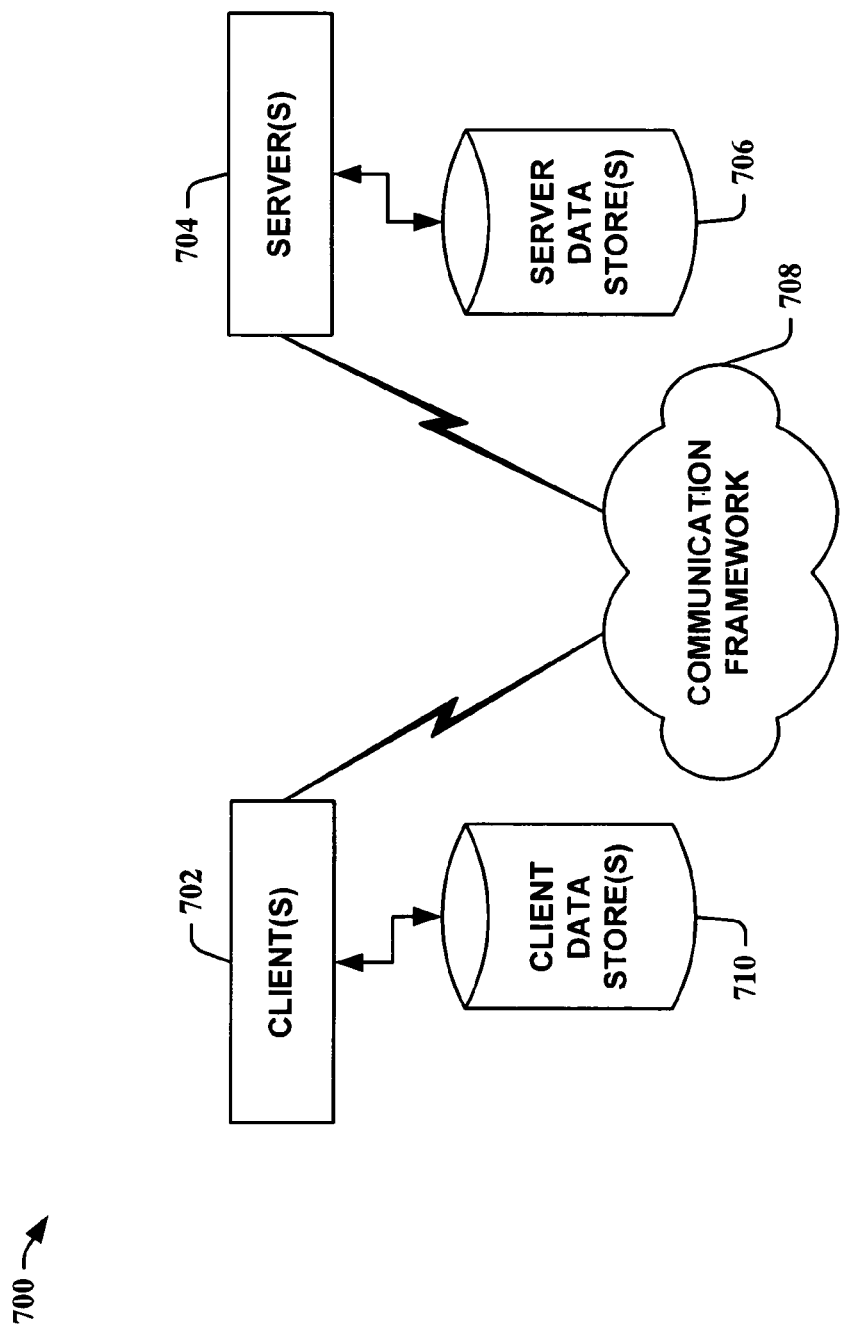
FIG. 7 illustrates another example operating environment in which the present invention can function.

FIG. 7 is another block diagram of a sample computing environment 700 with which the present invention can interact. The system 700 further illustrates a system that includes one or more client(s) 702. The client(s) 702 can be hardware and/or software (e.g., threads, processes, computing devices). The system 700 also includes one or more server(s) 704. The server(s) 704 can also be hardware and/or software (e.g., threads, processes, computing devices). One possible communication between a client 702 and a server 704 may be in the form of a data packet adapted to be transmitted between two or more computer processes. The system 700 includes a communication framework 708 that can be employed to facilitate communications between the client(s) 702 and the server(s) 704. The client(s) 702 are connected to one or more client data store(s) 710 that can be employed to store information local to the client(s) 702. Similarly, the server(s) 704 are connected to one or more server data store(s) 706 that can be employed to store information local to the server(s) 704.

In one instance of the present invention, a data packet transmitted between two or more computer components that facilitates searching is comprised of, at least in part, information relating to a tuned search that utilizes, at least in part, automatically derived, entity-specific relevance information.

It is to be appreciated that the systems and/or methods of the present invention can be utilized in search facilitating computer components and non-computer related components alike. Further, those skilled in the art will recognize that the systems and/or methods of the present invention are employable in a vast array of electronic related technologies, including, but not limited to, computers, servers and/or handheld electronic devices, and the like.

What has been described above includes examples of the present invention. It is, of course, not possible to describe every conceivable combination of components or methodologies for purposes of describing the present invention, but one of ordinary skill in the art may recognize that many further combinations and permutations of the present invention are possible. Accordingly, the present invention is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

The invention claimed is:

1. A system that facilitates searching, comprising the following components stored in computer memory and executable by a processor:
   a search query information receiving component that receives at least one search query from at least one entity, the query is utilized by a search engine to perform a search; and
   a search result component that tunes a search result received from the search engine to output a personalized result based on a function of automatically-derived, entity-specific relevance information, the entity-specific relevance information comprising information that is automatically derived from the at least one entity's similarity to at least one other entity, a satisfaction value based on satisfaction in a prior search result, and an indication of an interest by the at least one other entity in one or more prior search returned results returned for the given query,
   wherein the function of the automatically derived, entity-specific relevance information is normalized to provide an estimated relevancy probability.

2. The system of claim 1, the entity comprising a user, a group of users, or an enterprise.

3. The system of claim 1, the search component tunes the search via utilization of at least one of a filter or a ranking means.

4. The system of claim 1, the indication of interest comprising a value that indicates interest or disinterest.

5. The system of claim 1, the satisfaction value comprising a value that indicates satisfaction or dissatisfaction.

6. The system of claim 1, the search result component employs weighting to bias by the interest value or the satisfaction value when utilized to derive the entity-specific relevance information.

7. The system of claim 1, the entity's similarity derived from, at least in part, at least one prior search query, at least one prior selected search result, or demographic entity information.

8. The system of claim 1, the search result component employs weighting to bias by the entity's similarity to at least one other entity relative to another entity.

9. The system of claim 1, wherein the estimated relevance probability is derived utilizing:

$$\text{Estimated Relevancy Probability}(u, q, r) = \sum_{u' \in \text{entities who queried } q} \text{similarity}(u, u')^* \text{interest\_in}(u', q, r);$$

where, u is an entity, q is a query issued by the entity, r is a search result, and:

$$\text{interest\_in}(u', q, r) = \begin{cases} \alpha & \text{If entity } u' \text{ has ever issued query } q \text{ and expressed positive interest in return result } r \\ \beta & \text{If entity } u' \text{ has ever issued query } q \text{ and expressed negative interest in return result } r \\ 0 & \text{Otherwise} \end{cases}$$

10. The system of claim 9 wherein $\alpha$ has a value of 1 and $\beta$ has a value of −1.

11. The system of claim 1, wherein the estimated relevance probability is derived utilizing:

$$\text{Estimated Relevancy Probability}(u, q, r) = \sum_{\substack{u' \in \text{entities who expressed} \\ \text{interest in at least} \\ \text{one doc in the (big) return set for query } q}} \text{similarity}(u, u')^* \text{interest\_in}(u', r);$$

where, u is an entity, q is a query issued by the entity, r is a search result, and:

$$\text{interest\_in}(u', r) = \begin{cases} \alpha & \text{If entity } u' \text{ has ever issued some query and expressed positive interest in return result } r \\ \beta & \text{If entity } u' \text{ has ever issued some query and expressed negative interest in return result } r \\ 0 & \text{Otherwise} \end{cases}$$

12. The system of claim 11 wherein $\alpha$ has a value of 1 and $\beta$ has a value of −1.

13. The system of claim 1, wherein the search query receiving component and search result component are implemented on at least one selected from the group consisting of a computer, a server, and a handheld electronic device.

14. A computer-implemented method for facilitating searching, comprising:
   receiving at least one search query from at least one entity, the query is utilized by a search engine to perform a search;
   automatically deriving entity-specific relevance information comprising information derived from the at least one entity's similarity to at least one other entity, a satisfaction value based on satisfaction in a prior search result, and an indication of an interest by the at least one other entity in one or more prior search returned results returned for the query;
   tuning a search returned result based on a function of the automatically derived, entity-specific relevance information to output a personalized result; and
   normalizing the function of the automatically derived, entity-specific relevance information to provide an estimated relevancy probability.

15. The method of claim 14 the entity comprising a user, a group of users, or an enterprise.

16. The method of claim 14 further comprising:
   employing at least one of a filtering or ranking process to facilitate in tuning the search.

17. The method of claim 14 further comprising:
utilizing an interest value that is representative of interest or disinterest.

18. The method of claim 17 further comprising:
utilizing weighting to bias by the interest or disinterest when they are both employed to derive the entity-specific relevance information.

19. The method of claim 14 further comprising:
utilizing a satisfaction value that is representative of satisfaction or dissatisfaction.

20. The method of claim 19 further comprising:
utilizing weighting to bias by the satisfaction or dissatisfaction when they are both employed to derive the entity-specific relevance information.

21. The method of claim 14 further comprising:
utilizing weighting to bias by the interest value or the satisfaction value when they are both employed to derive the entity-specific relevance information.

22. The method of claim 14 further comprising:
utilizing an entity's similarity to at least one other entity and a prior indication of a search interest to derive the entity-specific relevance information.

23. The method of claim 22 further comprising:
deriving the entity's similarity from, at least in part, at least one prior search query, at least one prior selected search result, or demographic entity information.

24. The method of claim 22 further comprising:
employing weighting to bias by the entity's similarity to at least one other entity relative to another entity.

25. The method of claim 14, wherein the query is received via at least one selected from the group consisting of a computer, a server, and a handheld electronic device.

26. A system that facilitates searching, comprising the following components stored in computer memory and executable by a processor:
means for receiving at least one search query from at least one entity, the query is utilized by a search engine to perform a search;
means for automatically deriving entity-specific relevance information for the at least one entity, wherein the relevance information is derived from the at least one entity's similarity to at least one other entity, a satisfaction value based on satisfaction in a prior search result, and an indication of an interest by the at least one other entity in one or more prior search returned results returned for the given query;
means for tuning a search returned result based on the search query, as a function of the automatically derived, entity-specific relevance information to output a personalized result; and
means for normalizing the function of the automatically derived, entity-specific relevance information to provide an estimated relevancy probability.

* * * * *